(12) United States Patent
Svejda et al.

(10) Patent No.: US 10,872,308 B2
(45) Date of Patent: Dec. 22, 2020

(54) SYSTEM AND METHOD OF TRANSFERRING TEXTILE-TOOL INFORMATION

(71) Applicant: GROZ-BECKERT KG, Albstadt (DE)

(72) Inventors: Miroslav Svejda, Balingen (DE); Eric Schöller, Albstadt Pfeffingen (DE)

(73) Assignee: Groz-Beckert KG, Albstadt (DE)

( * ) Notice: Subject to any disclaimer, the term of this patent is extended or adjusted under 35 U.S.C. 154(b) by 527 days.

(21) Appl. No.: 15/568,357

(22) PCT Filed: Apr. 15, 2016

(86) PCT No.: PCT/EP2016/058386
§ 371 (c)(1),
(2) Date: Jun. 7, 2018

(87) PCT Pub. No.: WO2016/169851
PCT Pub. Date: Oct. 27, 2016

(65) Prior Publication Data
US 2018/0276599 A1  Sep. 27, 2018

(30) Foreign Application Priority Data
Apr. 20, 2015  (EP) .................................... 15164302

(51) Int. Cl.
*G06Q 10/08*  (2012.01)
*G06Q 30/06*  (2012.01)
(Continued)

(52) U.S. Cl.
CPC ......... *G06Q 10/087* (2013.01); *G06K 7/1417* (2013.01); *G06Q 10/06* (2013.01);
(Continued)

(58) Field of Classification Search
None
See application file for complete search history.

(56) References Cited

U.S. PATENT DOCUMENTS 6,676,014 B2 * 1/2004 Catan ................... G06Q 10/087
235/375
8,066,186 B2 * 11/2011 Kidwell ................... B65D 5/38
206/216
(Continued)

FOREIGN PATENT DOCUMENTS

CN  1914635 A  2/2007
CN  104049615 A  9/2014
(Continued)

OTHER PUBLICATIONS

Judson, K., "Alvin's Secret Code", http://suitableformixedcompany.blogspot.com/2008/03/book-note-alvins-secret-code-by.html, Mar. 3, 2008, retrieved Apr. 29, 2020. (Year: 2008).*
(Continued)

*Primary Examiner* — Nicholas D Rosen
(74) *Attorney, Agent, or Firm* — Fitch, Even, Tabin & Flannery LLP (57) ABSTRACT

A method and an equivalent system of transferring information (9, 12) relating to textile tools—preferably to knitting-machine and felting needles—from a tool sales organisation (1) to the tool user (2) is described and claimed. With this system, each type of textile tool is provided with a name (5) by the tool sales organisation (1), wherein •a software system books orders (4) from tool users (2), •at least one identification device (27) is provided with which quantities of textile tools are provided with labels (8), •the software system can activate the identification device (27), which assigns labels (8) that do not contain the name (5), •a forwarding system (7) is provided, •an information carrier (10) is provided, which is accessible to the tool user (2) and on which information (9, 12, 19) concerning the quantity of textile tools is assigned to the label (8).

16 Claims, 5 Drawing Sheets

(51) Int. Cl.
*G06Q 10/06* (2012.01)
*G06Q 50/04* (2012.01)
*G06K 7/14* (2006.01)

(52) U.S. Cl.
CPC ....... *G06Q 10/083* (2013.01); *G06Q 10/0832* (2013.01); *G06Q 10/0833* (2013.01); *G06Q 30/0631* (2013.01); *G06Q 30/0635* (2013.01); *G06Q 50/04* (2013.01); *Y02P 90/30* (2015.11)

(56) References Cited

U.S. PATENT DOCUMENTS

| | | | | |
|---|---|---|---|---|
| 8,463,659 | B2* | 6/2013 | Shakes | G06Q 30/0601 705/26.1 |
| 8,620,821 | B1* | 12/2013 | Goldberg | B07C 3/006 705/60 |
| 10,037,499 | B2* | 7/2018 | Hashimoto | G06Q 10/06 |
| 2002/0143643 | A1 | 10/2002 | Catan | |
| 2004/0267677 | A1* | 12/2004 | Mitsuoka | G06Q 10/08 705/400 |
| 2005/0149411 | A1* | 7/2005 | Colwell | G06Q 99/00 705/26.1 |
| 2008/0157933 | A1 | 7/2008 | Winkler | |
| 2009/0177560 | A1 | 7/2009 | Ishizuka | |
| 2009/0301921 | A1* | 12/2009 | Kidwell | B65D 5/38 206/459.5 |
| 2012/0143709 | A1* | 6/2012 | Shakes | G06Q 30/0601 705/26.1 |
| 2015/0120008 | A1* | 4/2015 | Hashimoto | G06Q 10/06 700/53 |
| 2015/0371183 | A1* | 12/2015 | Anderson | G06Q 10/0833 705/333 |

FOREIGN PATENT DOCUMENTS

| | | |
|---|---|---|
| DE | 60214991 T2 | 5/2007 |
| JP | 2011118572 A | 6/2011 |
| KR | 20070117414 A | 12/2007 |
| KR | 20090043599 A | 5/2009 |

OTHER PUBLICATIONS

Anon., Wikipedia article, "Clifford B. Hicks", https://en.wikipedia.org/wiki/Clifford_B_Hicks, retrieved Apr. 29, 2020. (Year: 2020).*
International Search Report and Written Opinion in corresponding International Application No. PCT/EP2016/058386, dated May 12, 2016, 12 pages.
European Search Report and Written Opinion in corresponding European Application No. 15 164 302.0, dated Jul. 22, 2015, 12 pages.
Korean Intellectual Patent Office, Notification of Reason for Refusal dated May 16, 2018, for Korean Patent Application No. 10-2017-7018530, with English Translation (13 pgs.).
Chinese First Office Action and Search report dated Jan. 19, 2020, in corresponding Chinese Application No. 201680023105.6, with English translation (19 pages).
Communication pursuant to Article 94(3) EPC dated Feb. 12, 2019, in corresponding European Patent Application No. 16 716 592.7 (9 pages).
Korean Intellectual Patent Office, Notice of Final Rejection dated Nov. 15, 2018, for Korean Patent Application No. 10-2017-7018530, with English Translation (6 pgs.).
European Summons to Attend Oral Proceedings pursuant to Rule 115(1) EPC dated Apr. 17, 2020, in corresponding European Application No. 16716592.7 (13 pages).
Chinese Second Office Action dated Jun. 16, 2020, in corresponding Chinese Application No. 201680023105.6, with English translation (10 pages).

* cited by examiner

SYSTEM AND METHOD OF TRANSFERRING TEXTILE-TOOL INFORMATION

CROSS REFERENCE TO RELATED APPLICATIONS

This patent application is the national phase of PCT/EP2016/058386 filed Apr. 15, 2016, which claims the benefit of European Patent Application No. 15164302.0 filed Apr. 20, 2015.

BACKGROUND

Textile tools are known. As used in this publication, the term refers to tools that are suitable for the manufacture of textile products and that are normally in direct contact with the textile materials during the production thereof. Textile needles are examples of textile tools of such kind. Needles of this sort include knitting-machine needles, sewing-machine needles, felting needles and warp-knitting-machine needles. However, the term "textile tools" also refers to system components, among which are sinkers. In the field of weaving, this term refers particularly to healds, heald frames and reeds. In the manufacturing of basic products, such as yarns and basic materials for felt, textile tools such as card wires must be mentioned in this context.

The practice of providing various products—among them industrial products—with identification means containing a wide range of information about the product, its quality, development, production and intended further processing is also familiar. Equipping products with RFID tags is one of many examples in this connection. DE 602 14 991 T2 discloses, amongst other things, a tag of this kind, which is intended for attachment to a product and which contains a range of the above-mentioned types of information.

So far, identification means of this kind have not normally been encountered in the field of textile tools. Here, by contrast, it is largely established practice to provide quantities of textile tools with descriptive names: for example, the field of felting needles and knitting-machine needles has witnessed the development of names some of which are understood worldwide by users of textile tools and from which a large proportion of the properties of the textile tools are apparent. A name of this kind often begins, for example, with a sequence of letters indicating the kind of needle (e.g. Vosa Spec). This sequence of letters is often followed by a sequence of numbers and further letters, which indicate specific dimensions such as the height of the needle butt or the shape of the needle hook. The described manner of passing on information, or of transporting information with the textile tools, proved of value in the past because it made for a high level of transparency. Many members of the value-added chain were able to view or glean valuable tool-related information from the tool name. This has advantages, particularly in the field of industrial tool users, because, firstly, textile tools are often stored for a long time in industrial plants and, secondly, are often subject to a high level of volatility.

Particularly in recent times, a major share of the textile value-added chain has been shifted to newly industrialised countries, which fortunately often show a high potential for economic growth. The high level of fluctuation in tool-user personnel, however, is among the disadvantages that this high economic growth potential poses for industrial tool users—that is, the companies that manufacture textiles—and their customers. These are frequently chain stores for textile products, which often also pass on manufacturing expertise to the tool users. This staff fluctuation leads to an outflow of secret manufacturing expertise, which also includes the choice of textile tools for a specific manufacturing job. Further important information in this connection naturally includes information concerning the operational parameters for the textile tools. The two latter types of information are often also supplied by textile-tool sales organisations. Some of these sales organisations are also affiliated with textile-tool manufacturers, while others work as sales representatives or intermediaries for one or more textile-tool manufacturers.

SUMMARY

For the reasons mentioned, the object of the present invention is to propose a method and a system which allows the required textile-tool information to be made accessible to specific, if necessary, selected, members of the textile value-added chain. The intention here is to avoid, as far as possible, the loss of manufacturing expertise.

According to this method, a textile-tool type is given a name, which may well be a descriptive name, by a sales organisation. This name is often also maintained in a software system that reflects the material flow in the sales organisation.

In consequence of an order process initiated by a customer, a quantity of textile tools is provided with a label, which, however, differs from this name. Moreover, the name is advantageously not recognizable from this label, nor does it emerge—initially—when the label is read electronically. Instead, this label is specific to the customer in question and/or the order in question and/or the factory in question and/or the textile-tool batch in question. This label is often even agreed upon by the tool user and the sales organisation.

The mentioned quantity of textile tools is forwarded to the tool user, this usually being undertaken by persons employed by the sales organisation to perform an obligation. The aforementioned software system often plays a role here: provision of the customer address, order number and often also the forwarding details are automated.

For delivery purposes, use may be made of special sales-organisation delivery services or of commercial postal systems, or else of shipping services employed by the business partner to perform this service. The at least one label is carried with the quantity of textile tools, or adheres thereto, during shipment and/or delivery. The sales organisation grants the tool user access to an information carrier. On this information carrier, information pertaining to the quantity of textile tools is assigned to the label, that is, to the identification code on the label. As mentioned already above, this information may consist of tool specifications (dimensions, nature of tool, tool material, shape of the tips or hooks, or it may also be information on the desired use of the tools).

The tool users and sales organisations are usually companies which have a plurality of employees and/or persons employed to fulfil an obligation. As a rule, therefore, the tool user will only grant access to the information carrier accorded him by the sales organisation to some of his employees and/or persons employed to fulfil an obligation. Access may be granted by passing on a code or password; it may also be the case, however, that the information carrier, which may also take the form of a chip, DVD or stick (i.e. an electronic data storage means) or of a hard copy, may be handed over to the tool user. More details on this will be given below. It is often appropriate for the tool user—and frequently also for the sales organisation—to grant, only to a limited category of persons, different levels of authorisation to access the information carrier.

Terms and conditions of business, prices and similar information pertaining to the quantity of textile tools may also be stored on the information carrier. Generally speaking, the name, which is initially given by the sales organisation, may be an in-house name and need not necessarily be attached to the quantity of textile tools. As a rule, it is to advantage if the label does not contain the name and is not reminiscent thereof. It is advisable and to advantage if the label adheres to the quantity of textile tools. As a rule, the term "quantity of textile tools" refers to a number of tools of any one type.

Different quantities of tools of any one type are advantageously supplied by the sales organisation to different tool users. It is also to advantage here if, at least, various quantities of this tool type go under the same name at the sales organisation. Alternatively, or in addition, however, a sales organisation with a software system for monitoring its material flow might just use, within the software system, a reference to a sub-directory as name. The labels for the various tool users would, in this case, have to be listed in this sub-directory.

It is also advantageous, however, if all tools of one type run under one name. In this context, it is furthermore useful to provide quantities of tools supplied to different customers with different labels. It must be emphasized here that it is not different country-specific product names (different languages) that are meant, but that these labels may and should differ from customer to customer.

For the purposes of this publication, a quantity of textile tools may be a single textile tool furnished with the label. However, the quantity of textile tools may also be a parcel of textile tools, which is furnished with the label. It is also frequent practice to transport several textile tools in packages. In this case, it is advantageous to furnish the package with the label.

Textile tools are often manufactured to suit the specific requirements of customers. In this case, following technical tests or deliberations, the sales organisation will suggest the textile tool to the tool user or even see to the development of a new tool or the modification of an existing one. Subsequently, one of the two partners will often suggest the label for this tool type.

The information carrier advantageously contains information on various types of needles, which are provided with different labels. The information pertaining to the different types of needles is assigned to the labels, thus making it locatable via the labels.

An information carrier may be a hard copy. It may contain or be furnished with a table. As a rule, however, an information carrier will be electrically or electronically readable. It is to advantage in this connection if the label includes an electronically readable identification code, and the information on the information carrier is detectable via this identification code. Particularly in cases where the information carrier is contactable via generally accessible information means (electronic and electrical telecommunication means), it is advantageous to encode the information carrier or to make it available only to the owners of codes or passwords.

It is also to advantage if the information carrier is a kind of virtual data room that can be supplied with information both by the tool user and by the sales organisation. Such information may also pertain to the production process for the tool user's textile products. Data concerning business agreements between tool user and sales organisation are also advantageous. Among these are prices and terms of trade. As identification code, all possible automatically readable information carriers may be considered.

The inventive method can for example be summarised as follows:

Clause 1: Method of transferring information (9, 12) relating to textile tools from a tool sales organisation (1) to a tool user (2), the method comprising:
receiving by a tool sales organisation computing device an order process (4);
in response to receiving the order process (4), marking a package (6) of textile tools by an identification device (27) with an identification code (15) that is configured to allow access to order specific information (9, 12) containing information specific to contents of the package (6);
receiving by an information carrier device (10) a request for at least a portion of the order specific information (9, 12) about the package (6) from a tool user computing device, the request including information derived from electronically reading the identification code by an electronic reading device (13);
in response to receiving the request and authorization information indicating that a user of the tool user computing device is allowed access to the at least the portion of the order specific information (9, 12) about the package (6), effecting provision of the at least the portion of the order specific information (9, 12) to the tool user via the tool user computing device.

Clause 2: Method according to clause 1,
further comprising generating by the tool sales organisation computing device the order specific information (9, 12) in response to receiving the order process (4)

Clause 3: Method according to clause 2,
wherein the generating the order specific information (9, 12) comprises generating unique order specific information (9, 12) for different order processes (4)

Clause 4: Method according to one of the preceding clauses,
wherein the marking the package (6) comprises marking packages (6) prepared in response to different order processes (4) with different identification codes (15).

Clause 5: Method according to one of the preceding clauses,
further comprising determining by the information carrier device (10) whether the authorization information is valid and effecting access to the at least the portion of the order specific information (9, 12) by the information carrier device (10) corresponding to the authorization information in response to determining that the authorization information is valid, wherein access is provided to different aspects of the order specific information (9, 12) in response to receipt of different authorization information.

An advantageous system via which a sales organisation can communicate textile-tool information to tool users contains the following features:

A software system reflecting the material flow within the sales organisation is often in place, which assigns names to different tool types. These names are often descriptive names that are also known outside of the sales organisation.

It is to advantage if this or another software system also books orders from tool users. As a rule, these orders are managed in commercial systems such as SAP or Oracle.

The sales organisation advantageously has an identification device with which quantities of textile tools can be provided with labels.

Additional advantages are gained if the identification device can be activated by the software system and the software system prompts the identification device to provide quantities of textile tools with labels that contain an electronically readable identification code but not the aforementioned name. For this purpose, the software system will normally be programmed to award labels that have been selected by the sales organisation and/or the tool user.

As a rule, textile-tool sales organisations have shipping departments or automated shipping facilities. These often receive information concerning the quantity of textile tools to be shipped from the software system reflecting the material flow.

Sales organisation of this kind use internal or external postal and/or delivery services to deliver the textile tools, the choice being of no issue for the purposes of this publication. During shipment, the label is carried with the quantity of textile goods. The system also contains an information carrier made available to the tool user. Information pertaining to the quantity of textile tools is located on this information carrier and is assigned to the identification code for the said quantity of textile tools, thus enabling the information to be read via the identification code.

The information carrier may be part of the tool user's computer system. As a rule, however, it is to advantage if the information carrier is accessible to the tool user and the sales organisation. For this purpose, the information carrier may be a website of the tool user or of the sales organisation. Alternatively or in addition, it is advantageous to use what is known as a portal solution, which allows information to be supplied to or read out from the information carrier.

It is advantageous to protect the information carrier with passwords, codes or also via a leased line between the tool user and the sales organisation in such a way as to prevent third parties, in particular, from accessing the information carrier. Additional advantages are obtained by distributing varying degrees of authorisation, or no authorisation, within the tool-user and/or sales-organisation companies. These measures, too, may be undertaken by the granting of (if necessary, different) codes or of levels of hierarchy or authorisation in the IT systems of the different companies. These measures may be effected by the sales organisation, maybe in agreement with the tool user. However, it is certainly also conceivable to configure access to the information carrier in such a way as to enable the tool user to grant access authorisations (and, as the case may be, write authorisations) autonomously.

It is furthermore to advantage if the tool user has at least one readout system for the identification code. This readout system may function fully automatically. Advantageously, it may also automatically establish contact with the information carrier and, as the case may be, directly with the information in question.

DETAILED DESCRIPTION

Figure 1:
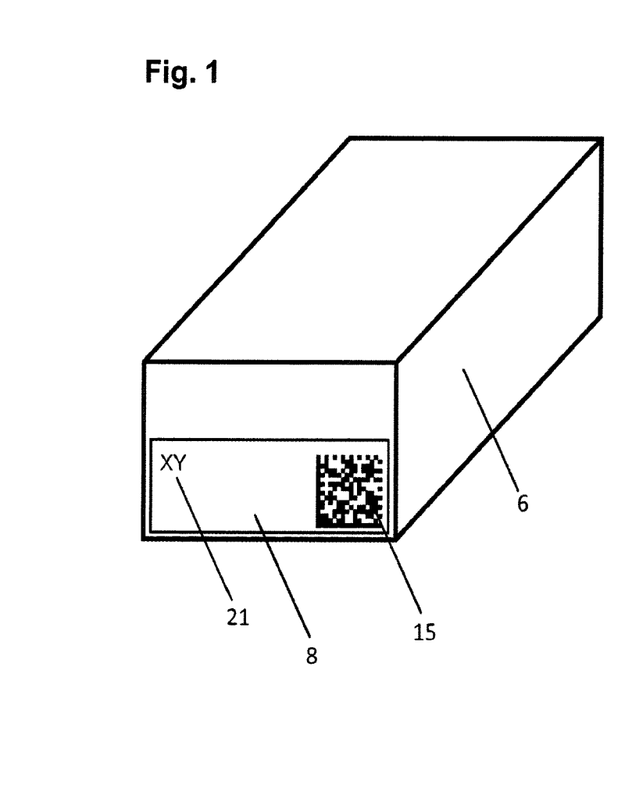
FIG. 1 shows a textile-tool package of the kind used, for example, for knitting-machine needles.

FIG. 1 shows a rectangular package 6 with a label 8. An electronically readable identification code 15 and the label text 21 are visible on the label (8). The text 21 is useful as it enables the tool-user staff, in particular, to name the quantity of tools contained in the package 6.

Figure 2:
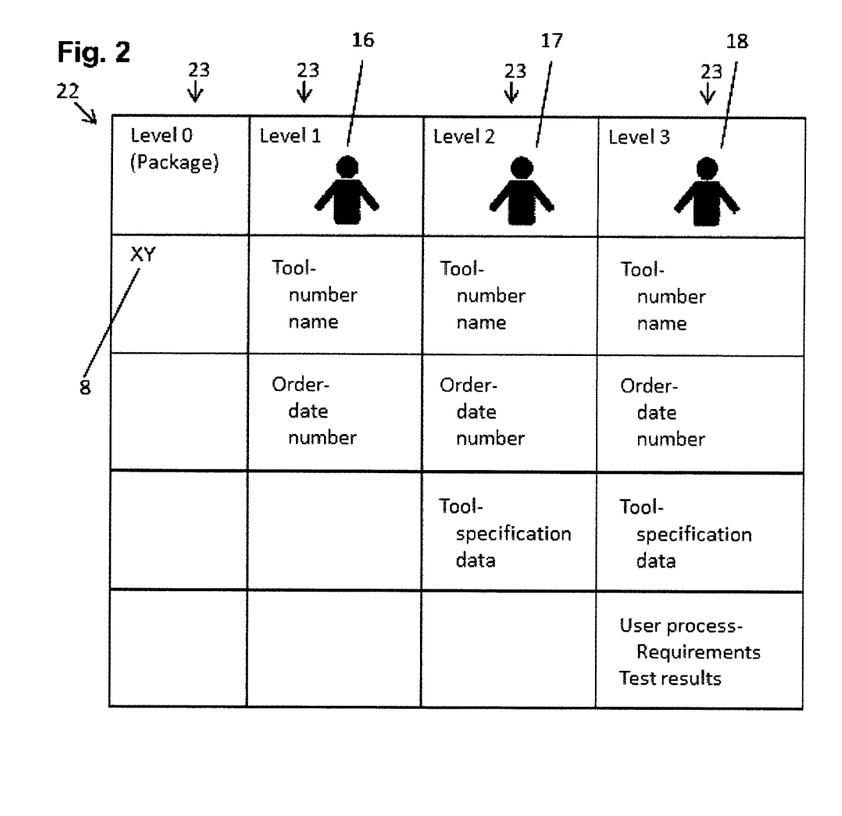
FIG. 2 is a diagram illustrating an authorisation hierarchy.

FIG. 2 shows a table of the kind that may be used according to the invention: the information of Table 22 pertaining to the quantity of textile tools contained in the package 6 is assigned to the label 8. The columns 23 in Table 22 show that employees 16, 17 and 18 of the tool user 2 have different levels of authorisation, giving them different degrees of access to the various pieces of information. However, Table 22 may also be seen as a symbol for the access hierarchy for electronically readable information carriers 10.

Figure 3:
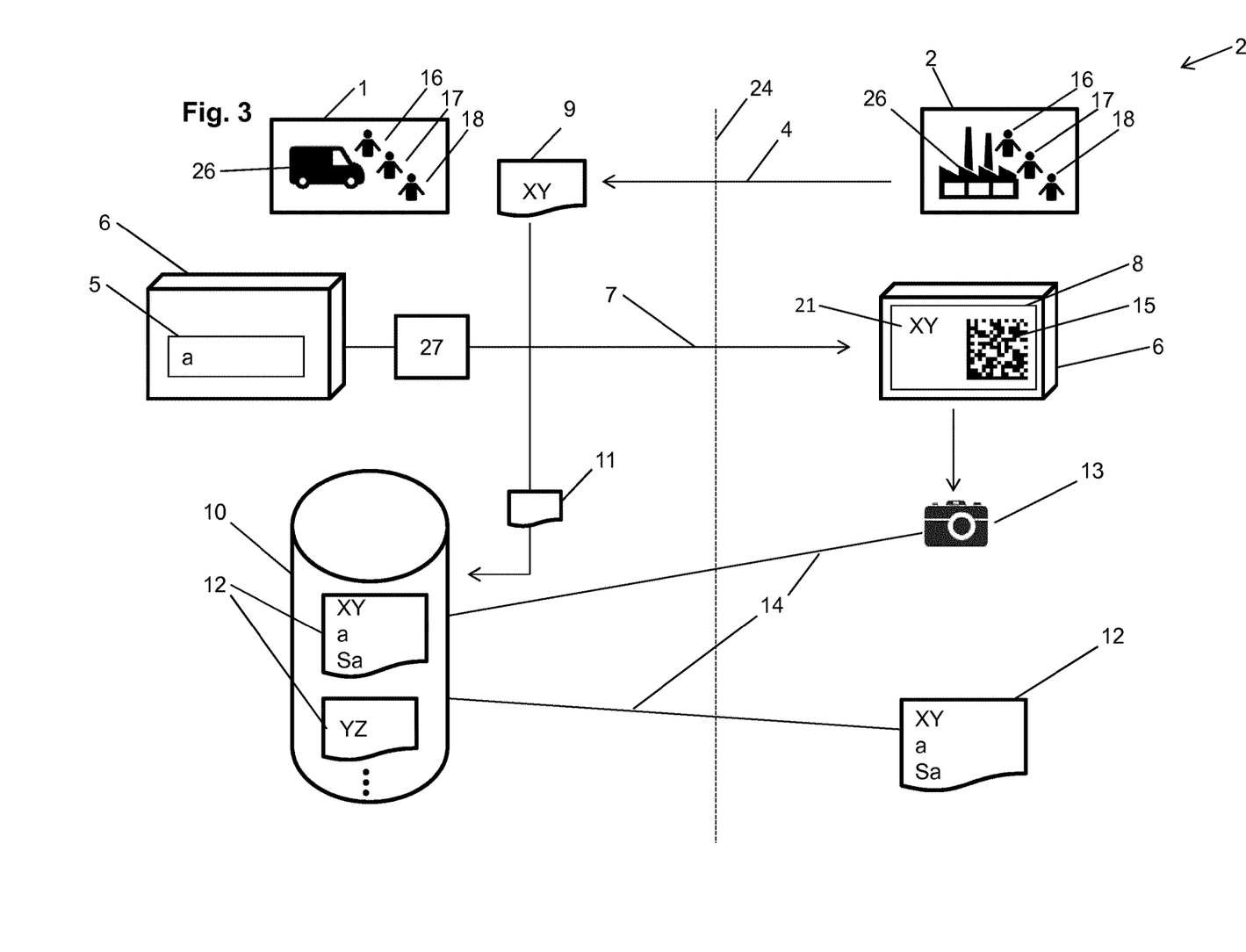
FIG. 3 is a diagram showing a first system for communicating textile-tool information.

FIG. 3 is a diagram of a system 25 according to the invention. FIG. 3 is divided by the line 24 into the domain of the tool sales organisation 1 and that of the tool user 2. The tool sales organisation 1 and the tool user 2 are companies whose persons 16, 17, 18 employed to fulfil an obligation have different levels of authorisation and different items of company inventory 26. In this embodiment, the activities of tool user 2 and sales organisation 1 commence with an order process 4. During this order process 4 the tool user 2 communicates specific information 9 relating to the order process 4 to the tool sales organisation 1. In this case, the tool sales organisation 1 transfers the specific order-process information to the information carrier 10, which may be a database or similar storage device that is connected to be accessible by a variety of computing devices, this step being visualized by the symbol 11. Further customers and batch-specific data 12 are stored on the information carrier 10. This is matched up with the specific data of the order process 9 and becomes available via the readout.

Figure 4:
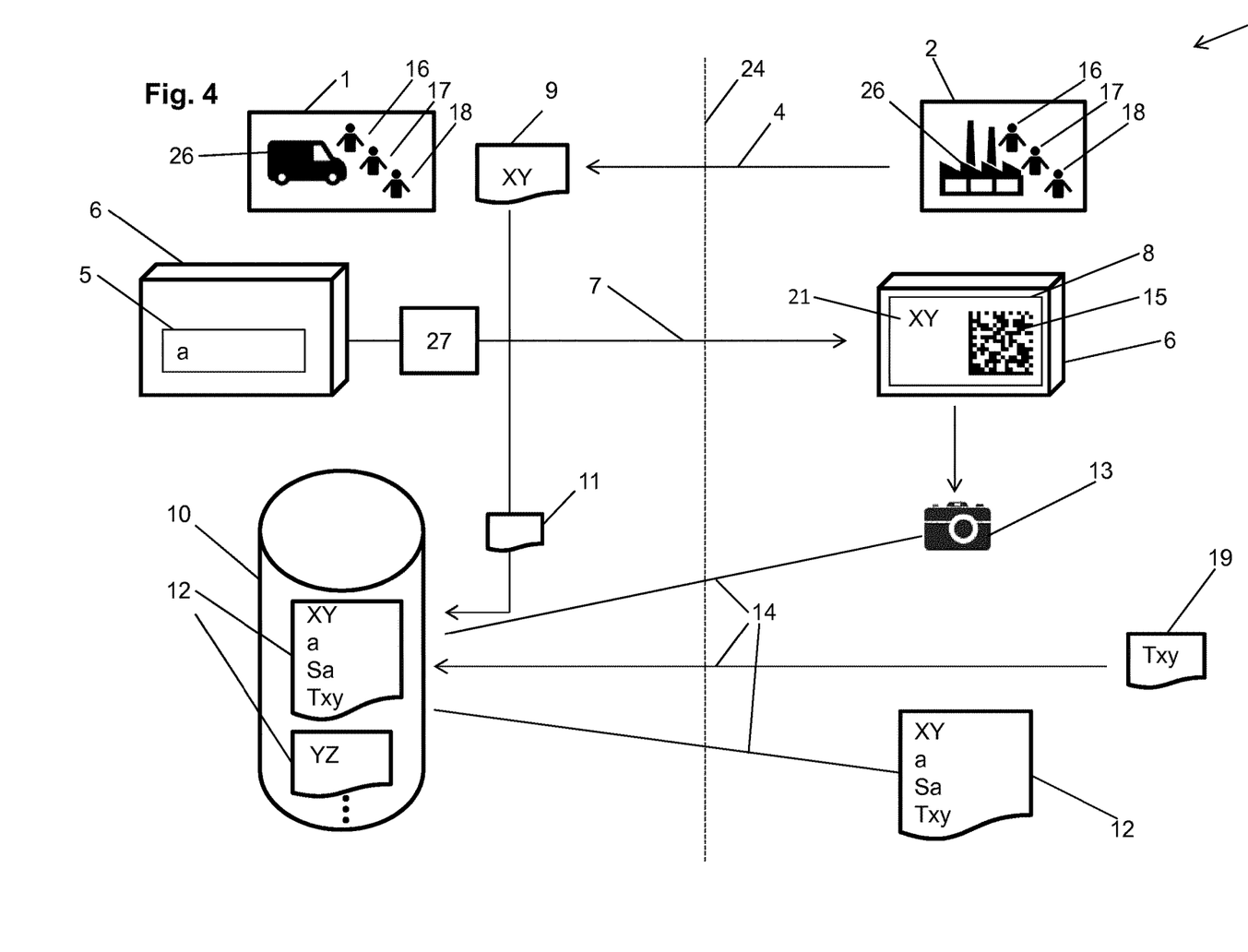
FIG. 4 is a diagram showing a second system for communicating textile-tool information.
Figure 5:
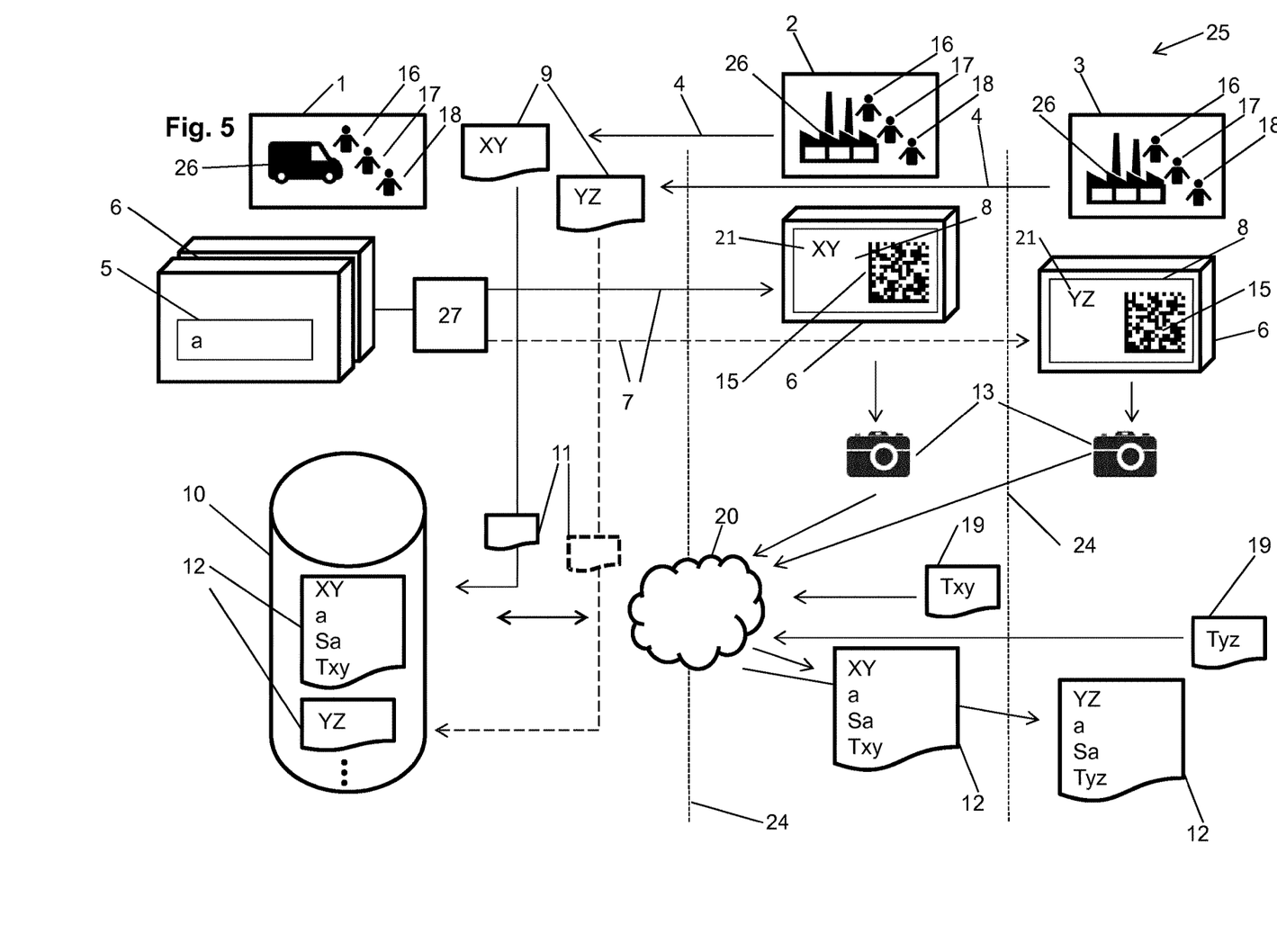
FIG. 5 is a diagram showing a third system for communicating textile-tool information.

For the tool sales organisation 1, the job-related work now begins. A quantity of textile tools is packed in the package 6 and prepared for the forwarding process 7. Many tool sales organisations 1 are able to fall back on what is in stock. It is just as possible, of course, that the particular type of textile tool is not available, so that a manufacturing order has to be sent to the tool manufacturer. In many cases, tool manufacturer and tool sales organisation 1 belong to the same group. The entity with the name 5 makes it clear that the name 5 used by the tool sales organisation 1 may also adhere to the quantity of textile tools. However, this is by no means necessary, as it often suffices to manage quantities of textile tools in a commercial software system. In FIGS. 3, 4 and 5, the software system and possible connecting lines via which the software system activates or reads other elements of the system 25 have been left out. Before it is delivered to the tool user 2, the quantity of textile tools is routed to the identification device 27, where it is provided with the label 8. The identification device 27 may, as one alternative, be a labelling device, but it is also possible that it provides an existing package, an existing label, etc., with additional marking. Textile tools may, of course, also be marked by means of engraving systems or lasers. The identification device 27 is configured to communicate with other computing devices, such as a computing device configured to handle the order process 4, to receive from such a computing device the specific order-process information and mark the package 6 with the electronically readable identification code 15 and the label text 21 on the label 8 based on the specific order-process information. So configured, the package 6 now carries order-specific information that can only be accessed by a tool user 2 having authorization information such as the code or other access information necessary to access that information.

The arrow 7 stands for the forwarding of the quantity of textile tools by the tool sales organisation 1 to the tool user 2. As already mentioned in the introductory part of the description, this forwarding process 7 involves a dispatch activity (to whom is the quantity of textile tools being sent) and a shipping process, in which the quantity of textile goods is brought to a factory of the tool user 2. The package 6, bearing the identification provided by the identification device 27, is shown again on the right in the drawing—i.e. in the domain of the tool user 2. The label 8 on the package 6 includes a text 21 that enables staff of the tool user 2 to verbally name the quantity and/or the type of textile tools. In this embodiment, the label 8 also has an identification code 15, which can be read electronically with, for example, the electronic reader 13. The identification code 15 contains a link to the information carrier 10, with which information 12 may be read out of the information carrier 10 via telecommunication means 14, such as, for example, any one of a various known network configurations, e.g., the Internet, or the like that allow for communication between computing devices. This information 12 may be transmitted, again via telecommunication means 14, to the domain of the tool user 2. Still to be mentioned are the persons 16, 17 and 18 employed by the sales organisation 1 and the tool user 2 to fulfil an obligation, who have different levels of authorisation for accessing information. As a rule, additional codes or passwords will be required in order to read out the information, as was described above, via the link and the identification code 15. The different authorisation levels, too, may be realised, among other means, by way of different codes. In one example, a code or password must be transmitted to the information carrier 10 and verified before the information 12 is transmitted to a computing device for the tool user 2. In another approach, the information 12 is transmitted to a computing device for the tool user 2 in an encrypted form, only to be decrypted by the computing device in response to receiving an authorized code or password at the tool user's 2 computing device. So configured, a given person in possession of the package 6 cannot discern the specific details of the package's contents without having an authorized code indicating that the user may access the information and use the contents of the package. This particularly designed computing system thereby provides a technical solution to combat grey market sales of such products and providing computing device verification of use of the correct tools. For instance, a user who purchases a package from an unauthorized seller will not be able to know without great expense and inspection what is in a package of textile tools given the nature of textile tools, i.e., being difficult to discern exact designs or features based on a cursory visual inspection. Thus, implementation of this technical approach with the various described devices frustrates such a user and incentivizes such a user to procure such goods from only tool sales organisations 1 using an embodiment of the described system.

FIG. 4 shows a system 25, which is almost identical to that of FIG. 3. In addition to the objects shown in FIG. 3, however, FIG. 4 symbolises that the tool user 2 may also be provided with write authorisation for the information carrier 10. This circumstance is symbolised in that production-process data 19 may also be communicated, via telecommunication means 14, to the information carrier 10. Of course, other kinds of information, too, may be stored in the described manner by the tool user 2 on the information carrier 10.

FIG. 5 shows another, third, embodiment of the invention, which builds on the embodiment of FIG. 4. In FIG. 5 however, two tool users 2, 3 are shown instead of one tool user 2. The domains of the two tool users 2, 3 are also mutually delimited, again by a dashed line 24. Both tool users 2, 3 have write authorisation for the information carrier 10, in an equivalent manner to that shown in FIG. 4. The two tool users 2, 3 have labels 8 which are provided with different texts 21 and different identification codes 15. This measure too, as already explained in the introductory part of the description, is advantageous. A further, additional feature of the third embodiment, shown in FIG. 5, consists in use of the cloud 20. In this embodiment, the data of tool users 2, 3 and of the tool sales organisation 1 is stored in the cloud 20 and made accessible, in line with the access hierarchy, to those persons 16, 17, 18 with access authorisation.

Figure 6:
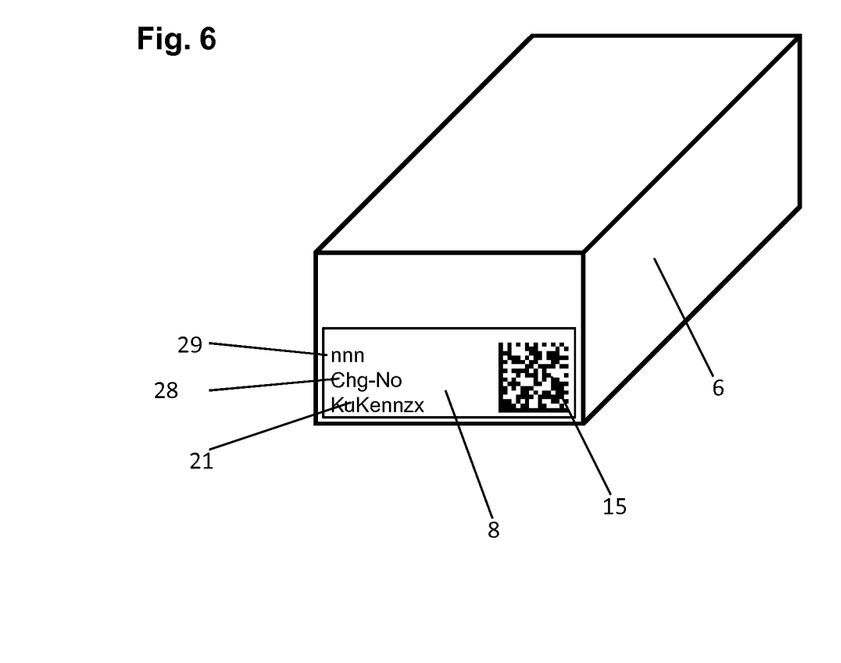
FIG. 6 shows a further embodiment of a textile-tool package.

FIG. 6 shows another parcel 6 of textile tools. In addition to the identification code 15 and the text 21, the label 8 includes the batch number 28 and the number of textile tools 29 contained in the parcel 6. The presence of this information 28, 29 on the label 8 is advantageous for all embodiments of the invention.

| List of reference numerals | |
| --- | --- |
| 1 | Tool sales organisation |
| 2 | Tool user |
| 3 | Tool user |
| 4 | Order process |
| 5 | Name |
| 6 | Textile-tool parcel/package |
| 7 | Forwarding process |
| 8 | Label |
| 9 | Specific order-process information |
| 10 | Information carrier |
| 11 | Transfer of the specific data relating to the order process, the label and the name (additional tool data where necessary) to the information carrier |
| 12 | Customer-, job-, works- and batch-specific data pool |
| 13 | Electronic reader |
| 14 | Telecommunication means |
| 15 | Identification code |
| 16 | Tool user or person employed by the tool-sales-organisation to fulfil an obligation, authorisation level 1 |
| 17 | Tool user or person employed by the tool-sales-organisation to fulfil an obligation, authorisation level 2 |
| 18 | Tool user or person employed by the tool-sales-organisation to fulfil an obligation, authorisation level 3 |
| 19 | Production-process information |
| 20 | Cloud |
| 21 | Label text |
| 22 | Table |
| 23 | Column of table |
| 24 | Dashed line |
| 25 | System |
| 26 | Items of company inventory |
| 27 | Identification device |
| 28 | Batch number/Number of the batch to which the quantity of textile tools belongs |
| 29 | Number of textile tools in a package/parcel |

The invention claimed is:

1. A method of transferring information relating to textile tools from a tool sales organisation to a the tool user, in which at least one textile-tool type is provided in each case with at least one name by the tool sales organisation, the method comprising:

providing, in response to receipt of an order process initiated by the tool user, a quantity of textile tools of this type with at least one label, said label one or more of differing from the at least one name and not containing the at least one name;
the label being specific to one or more of the tool user, the order process, a factory and a batch;
the quantity of textile tools ordered in the order process being forwarded to the tool user;
the at least one label being provided with the quantity of textile tools for identification thereof,
the quantity of textile tools being free of the name,
the label featuring an identification code;
the tool sales organisation granting the tool user access to an information carrier;
and information concerning the quantity of textile tools being assigned to the identification code on this information carrier.

2. The method according to claim 1, wherein
at least two tool users, who are being supplied with quantities of any one textile-tool type,
are supplied with differently labelled quantities of the textile-tool type.

3. The method according to claim 1 wherein the quantity of textile tools is one of:
a single textile tool,
a parcel of textile tools,
and a package containing a quantity of textile tools furnished with the label.

4. The method according to claim 1, wherein
the tool user communicates requirements pertaining to the textile tool to the tool sales organisation one of before the order process and during the order process; and,
the tool sales organisation one of proposes a tool from among the existing tool types and sees to the development of a suitable new tool.

5. The method according to claim 1, wherein the information carrier assigns information pertaining to different types of needles to different labels.

6. The method according to claim 1, wherein the information is read out from the information carrier electronically.

7. The method according to claim 1, wherein the information is one or more of read out from and written into the information carrier via one of electrical and electronic telecommunication means.

8. The method according to claim 1, wherein the information is written into the information carrier by one or more of the tool user and the tool sales organisation.

9. The method according to claim 1, wherein information pertaining to the production process for the textile products of the tool user is stored in the information carrier.

10. The method according to claim 1, wherein the identification code is read electronically.

11. The method according to claim 1, wherein the identification code one or more of
contains a barcode,
includes an RFID tag,
and contains a Data Matrix code.

12. A system of transferring information relating to textile tools from a tool sales organisation to a tool user, the system comprising:
a software system, wherein the software system includes at least one processor and memory configured to store software associated with the software system, wherein the software system is configured to record the material flow within the tool sales organisation to assign at least one name to tool types, and
to book orders from tool users;
at least one identification device, with which quantities of textile tools can be provided with labels that contain an electronically readable identification code;
an identification device of the at least one identification device is configured to be activated by the software system, which is set in such a way that the identification device is configured to furnish the quantities of textile tools with labels, which do not contain the name;
a forwarding system with which the quantity of textile tools can be shipped to the tool user, the label being sent together with the quantity of textile tools; and
an information carrier, which is accessible to the tool user and on which information concerning the quantity of textile tools is assigned to the identification code.

13. The system according to claim 12, wherein the information carrier is one or more of:
part of the computer system of the tool user,
a website of the tool user or of the tool sales organisation,
and a portal of one of the tool user and the tool sales organisation.

14. The system according to claim 12, wherein the information carrier can be set in such a way that it can only be read by one or more of the tool user and the tool sales organisation with at least one additional password.

15. The system according to claim 12, wherein the information carrier is set in such a way as to grant one or more of persons employed by the tool user and the tool sales organisation to fulfil an obligation, or one or more of vicarious agents of the tool user and the tool sales organisation to fulfil the obligation, different degrees of access to information pertaining to the quantity of textile tools, said degrees of access depending on levels of authorisation.

16. The system according to claim 12, comprising at least one readout system for the tool user, with which the identification code can be read.

* * * * *